(12) United States Patent
Hax

(10) Patent No.: US 7,705,715 B2
(45) Date of Patent: Apr. 27, 2010

(54) VEHICLE WEIGHING

(75) Inventor: Stefan Georg Hax, Pickering (CA)

(73) Assignee: TruckWeight Inc., Bedford, Nova Scotia ( * ) Notice: Subject to any disclaimer, the term of this patent is extended or adjusted under 35 U.S.C. 154(b) by 361 days.

(21) Appl. No.: 11/700,137

(22) Filed: Jan. 31, 2007

(65) Prior Publication Data
US 2008/0007392 A1 Jan. 10, 2008

Related U.S. Application Data

(60) Provisional application No. 60/763,893, filed on Feb. 1, 2006.

(51) Int. Cl.
B60Q 1/00 (2006.01)

(52) U.S. Cl. .................. 340/440; 340/447; 177/141

(58) Field of Classification Search ............ 340/440, 340/442, 445, 447; 177/136, 141
See application file for complete search history.

(56) References Cited

U.S. PATENT DOCUMENTS

| 4,606,419 | A | * | 8/1986 | Perini | 177/141 |
|---|---|---|---|---|---|
| 5,478,974 | A | * | 12/1995 | O'Dea | 177/136 |
| 5,780,782 | A | * | 7/1998 | O'Dea | 177/136 |
| 6,025,563 | A | * | 2/2000 | Lesesky et al. | 177/136 |
| 6,034,596 | A | * | 3/2000 | Smith et al. | 340/447 |
| 6,921,100 | B2 | * | 7/2005 | Mantini et al. | 340/440 |
| 7,443,288 | B2 | * | 10/2008 | Dunbridge et al. | 340/444 |
| 2002/0038193 | A1 | * | 3/2002 | Grunberg et al. | 701/37 |
| 2003/0156021 | A1 | * | 8/2003 | Tabata et al. | 340/442 |
| 2007/0181350 | A1 | * | 8/2007 | Kranz et al. | 177/136 |

* cited by examiner

Primary Examiner—John A Tweel, Jr.
(74) Attorney, Agent, or Firm—Young & Thompson

(57) ABSTRACT

A vehicle weight determination apparatus is disclosed which includes a receiver; a persistent memory storing a plurality of sensor identifiers, a like plurality of axle identifiers and a like plurality of correlation information, such that a given sensor identifier is associated with a given axle identifier and given correlation information. The apparatus also includes a controller for: receiving from the receiver a message comprising a sensor identifier and an air pressure indication, utilitising the sensor identifier to obtain an axle identifier and correlation information, and utilising the correlation information and the pressure indicator to obtain a weight measure associated with the axle identifier. The apparatus may include a display for displaying the weight measure and the axle identifier.

39 Claims, 9 Drawing Sheets

VEHICLE WEIGHING

CROSS-REFERENCE TO RELATED APPLICATION

This application claims priority from U.S. provisional application No. 60/763,893, filed Feb. 1, 2006, the contents of which are hereby incorporated herein by reference.

BACKGROUND

This invention relates to vehicle weighing.

It may be desirable to know the weight of a commercial vehicle for a number of reasons. Firstly, the amount charged for transporting cargo by vehicle is normally based upon distance to destination and on the weight of the cargo. Cargo weight may be determined by subtracting the loaded weight of the vehicle from its empty weight. Secondly, it is inefficient to drive a partially loaded vehicle. To avoid this, a vehicle could be loaded with a variety of different loads, however, in such instance the vehicle can be weighed to ensure the loads do not exceed the maximum capacity of the vehicle. Further, public authorities have an interest in ensuring certain weight restrictions are adhered to on public highways in order to protect the public infrastructure. And fines may be levied on vehicles which exceed specific weight limitations.

While weigh scales can be used to obtain the axle weight, and total weight, of vehicles, scales may not be conveniently available when needed. For this reason, a number of on-board weighing systems have been developed.

Nevertheless, there remains a need for an improved on-board vehicle weighing approach.

SUMMARY OF INVENTION

According to one aspect of the invention there is provided a method for determining a vehicle weight comprising: receiving a message comprising a sensor identifier and a weight related parameter indication; utilising the sensor identifier to obtain correlation information; obtaining a weight measure based on the weight related parameter indication and the correlation information.

According to another aspect of the invention there is provided a vehicle weight determination apparatus, comprising: a receiver; a persistent memory storing a plurality of sensor identifiers, a like plurality of axle identifiers and a like plurality of correlation information, such that a given sensor identifier is associated with a given axle identifier and given correlation information; a controller for: receiving from the receiver a message comprising a sensor identifier and an air pressure indication, utilitising the sensor identifier to obtain an axle identifier and correlation information, utilising the correlation information and the pressure indicator to obtain a weight measure associated with the axle identifier.

According to another aspect of the invention there is provided a vehicle weight determination apparatus, comprising: a pressure transducer; a transmitter; a persistent memory for storing a sensor identifier; a controller for: receiving a pressure indication from the pressure transducer and a temperature indication from the temperature transducer; retrieving the sensor identifier; constructing a message comprising the sensor identifier, the pressure indication, and the temperature indication; controlling the transmitter to send the message.

According to another aspect of the invention there is provided a method for determining a vehicle weight comprising: generating a message comprising a sensor identifier and a weight related parameter indication; broadcasting the message to a unit comprising a receiver; the receiver receiving the message; the unit utilising the sensor identifier to obtain correlation information; the unit obtaining a weight measure based on the weight related parameter indication and the correlation information; displaying the weight measure on a display associated with the unit.

According to another aspect of the invention there is provided a system for determining a vehicle weight comprising a sensor and a unit: the sensor operable to generate a message comprising a sensor identifier and a weight related parameter indication and broadcast the message to the unit; the unit comprising a receiver for receiving the message broadcast from the sensor and the unit operable to utilise the sensor identifier to obtain correlation information stored in a database; the unit operable to generate a weight measure based on the weight related parameter indication and the correlation information and operable to display the weight measure on a display associated with the unit.

According to another aspect of the invention there is provided a kit comprising: a sensor and a unit; the sensor comprising a housing and being operable to generate a message comprising a sensor identifier and an air pressure indication and broadcast the message to a unit; the hand held device comprising a receiver for receiving the message broadcast from the sensor and the unit operable to utilise the sensor identifier to obtain correlation information stored in a database; the unit operable to generate a weight measure based on the air pressure indication and the correlation information and operable to display the weight measure on a display in the unit; the kit further comprising a length of tubing and a connector, the connector adapted for being inserted into an air vehicle suspension line of a vehicle air suspension system, and the length of tubing adapted to connect an outlet of the connector to an inlet to the housing of the sensor.

According to another aspect of the invention there is provided a method of retrofitting a vehicle comprising an air suspension system, the air suspension system comprising at least one air spring associated with an axle or axle group, the air spring comprising an air line for supplying pressurized air to the air spring, the method comprising: attaching a sensor to the vehicle, the sensor comprising an inlet for receiving communication of pressurized air, the sensor operable to generate a message comprising a sensor identifier and an air pressure indication related to pressure of the pressurized air and broadcast the message to a unit; introducing a connector into the air line in the air suspension system to provide an outlet; connecting the outlet of the connector to the inlet of the sensor, so as to communicate pressurized air from the air line to the inlet of the sensor.

According to another aspect of the invention there is provided a sensor comprising a housing comprising an inlet for receiving communication of pressurized air, the sensor operable to generate a message comprising a sensor identifier, and an air pressure indication related to a pressure of the pressurized communicated to the inlet, and broadcast the message to a unit.

According to another aspect of the invention there is provided a method for determining a weight of a vehicle comprising: providing a plurality of sensors, each of the sensors associated with an axle or axle group of the vehicle; each sensor generating a message comprising a sensor identifier and a weight related parameter indication; broadcasting each message from each sensor to a unit.

According to another aspect of the invention there is provided a method for determining a weight of each of a plurality of vehicles comprising: providing at least one sensor for each vehicle of a plurality of vehicles; each sensor generating a message comprising a sensor identifier and a weight related parameter indication; broadcasting each message from each sensor to a unit.

According to another aspect of the invention there is provided a kit comprising: a sensor comprising a housing and the sensor being operable to generate a message comprising a sensor identifier and an air pressure indication and broadcast the message to a unit; a length of tubing; a connector adapted for being inserted into an air vehicle suspension line of a vehicle air suspension system, and the length of tubing adapted to connect an outlet of the connector to an inlet to the housing of the sensor.

According to another aspect of the invention there is provided a method for determining vehicle weight information comprising: (a) broadcasting a message comprising a sensor identifier and a weight related parameter indication; (b) utilizing the sensor identifier to obtain correlation information; (c) obtaining a weight measure based on the weight related parameter indication and the correlation information. Steps (a)-(c) may be repeated at a periodic interval.

According to another aspect of the invention there is provided a method for determining a weight of a vehicle comprising: providing a sensors associated with an axle or axle group of the vehicle; the sensor generating a message comprising a sensor identifier and a weight related parameter indication; broadcasting each message from each sensor to a unit at a periodic interval.

The periodic interval may be variable and may be varied by an external input. The methods may also include measuring the change in the weight related parameter over an interval of time; monitoring said measured change to determine when said measured change exceeds a threshold level; and when said measured change exceeds said threshold level, adjusting the value of said periodic interval. The value may be adjusted to shorten the length of said periodic interval. The interval of time may correspond to said periodic interval. The weight related parameter indication may be an air pressure indication. Other features and advantages will become apparent from the following description in conjunction with the drawings.

BRIEF DESCRIPTION OF THE DRAWINGS

In the figures which illustrate an example embodiment of the invention.

DETAILED DESCRIPTION

Figure 1A:
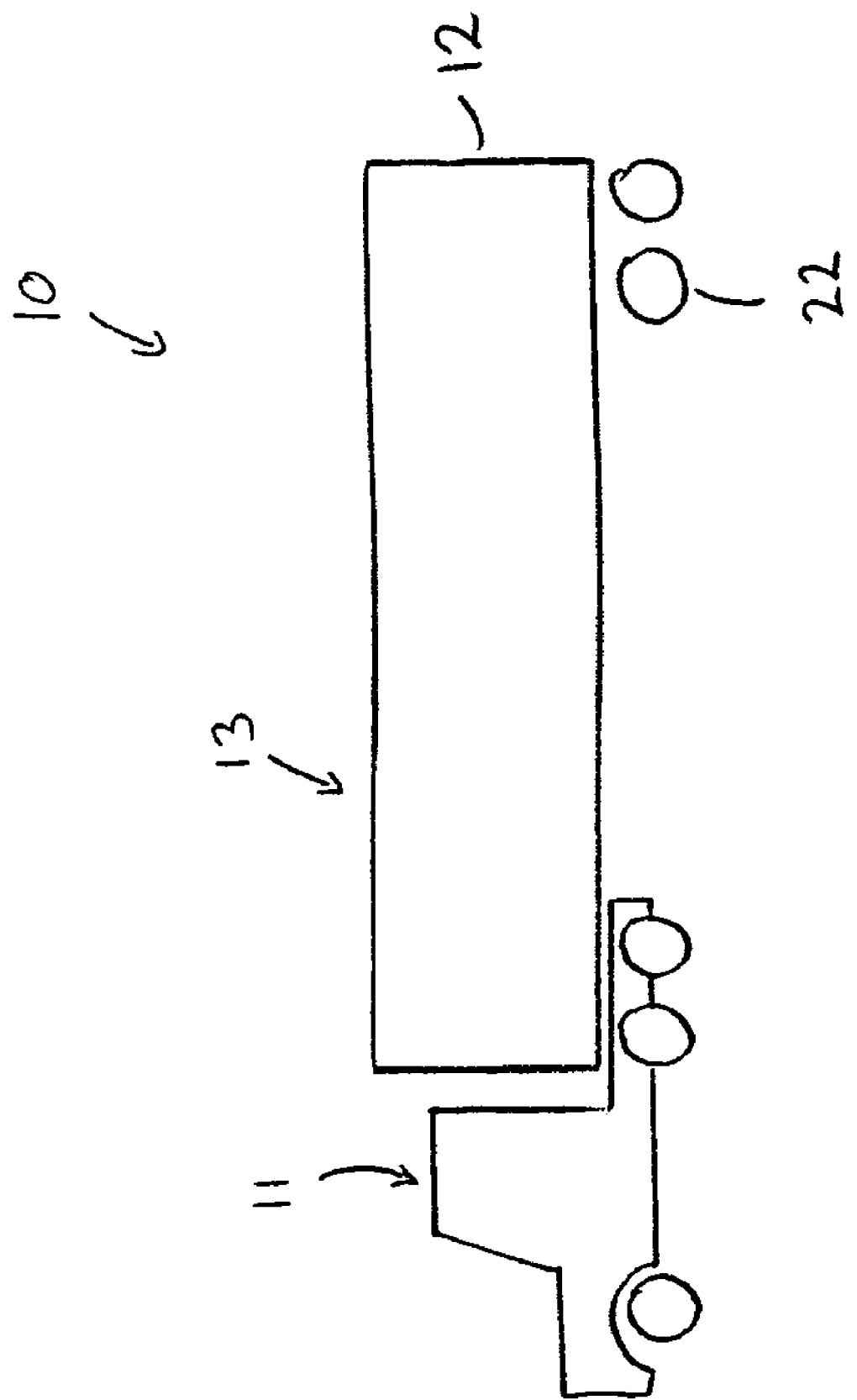
FIG. 1A is a schematic side view of a vehicle suitable for use with this invention.
Figure 1B:
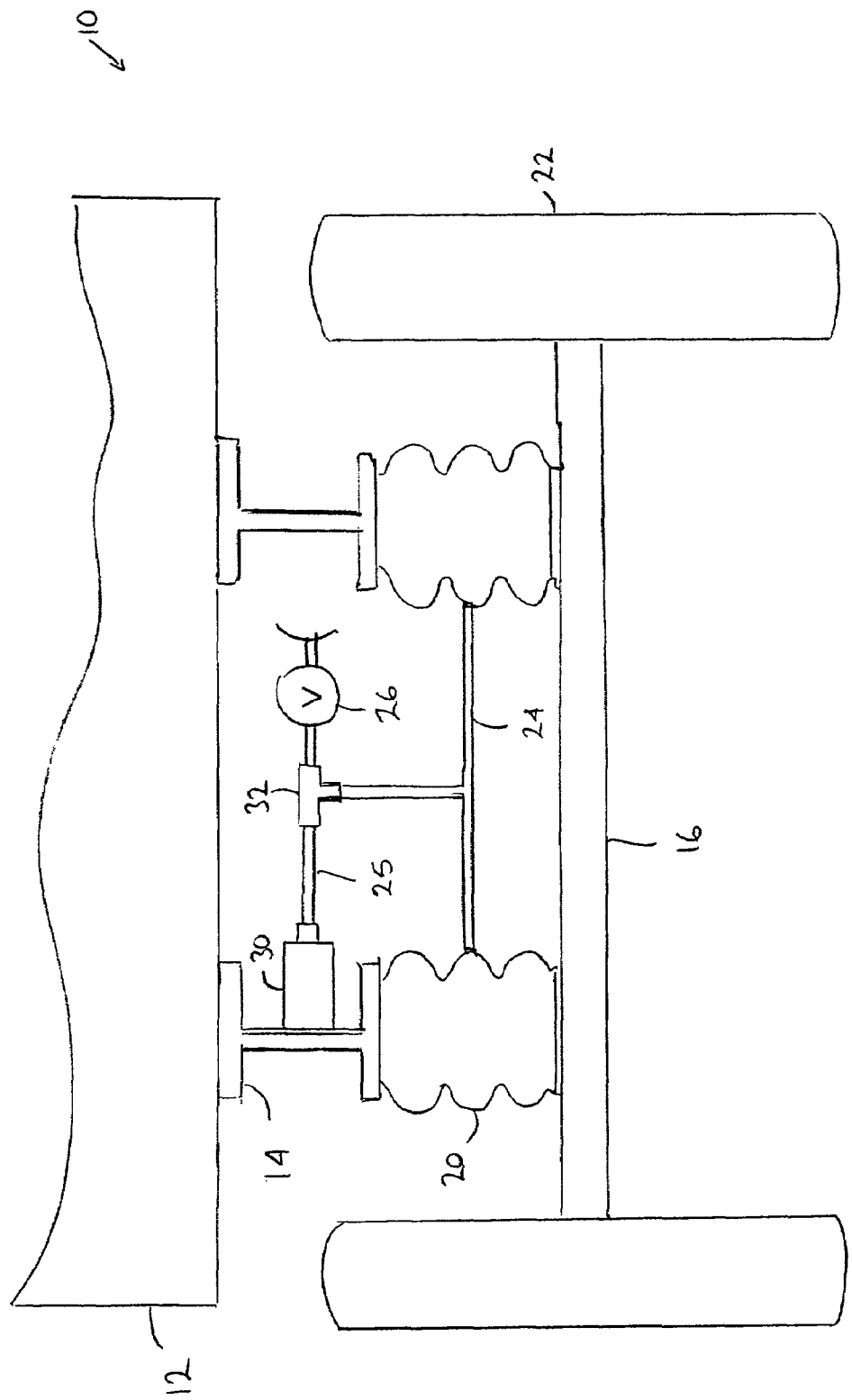
FIG. 1B is a schematic rear view of the vehicle of FIG. 1A showing a portion of a weight sensing system according to an embodiment of this invention.

Turning to FIGS. 1A and 1B, a vehicle 10 may have a truck 11 pulling a trailer 13. The trailer may have a body 12 resting on long sills or rails 14. As is typical with a large number of commercial cargo carrying vehicles, the suspensions are air springs. Thus, for trailer 13, the long sills 14 of the body 12 may be coupled to each axle 16 of the trailer through air springs 20. Each axle may terminate in wheels 22. The air pressure for the air springs may be provided through an air pressure line 24 which may be supplied by a compressor (not shown) driven by the motor of the truck 11 pulling the trailer 13. A valve 26 may be incorporated into the air line supplying the air springs 20 for an axle 16 so that the air pressure supplied to the air springs may be regulated based on the weight of the load in the trailer so that the air springs do not allow the long sills to bottom out (i.e., impact the axles) as the trailer travels.

A sensor 30 may be connected to air pressure line 24 between the valve 26 and air springs 20 through T-connector 32 and line 25. In consequence, the sensor 30 is in fluid communication with the air inside air springs. The sensor 30 may be attached to the frame of the trailer, such as to one of the long sills 14. While not shown in the drawings, the sensor may be mounted to the outside surface of the sill, which as will be explained in further detail hereafter, may provide for a greater broadcasting range for its transmitter.

Figure 2:
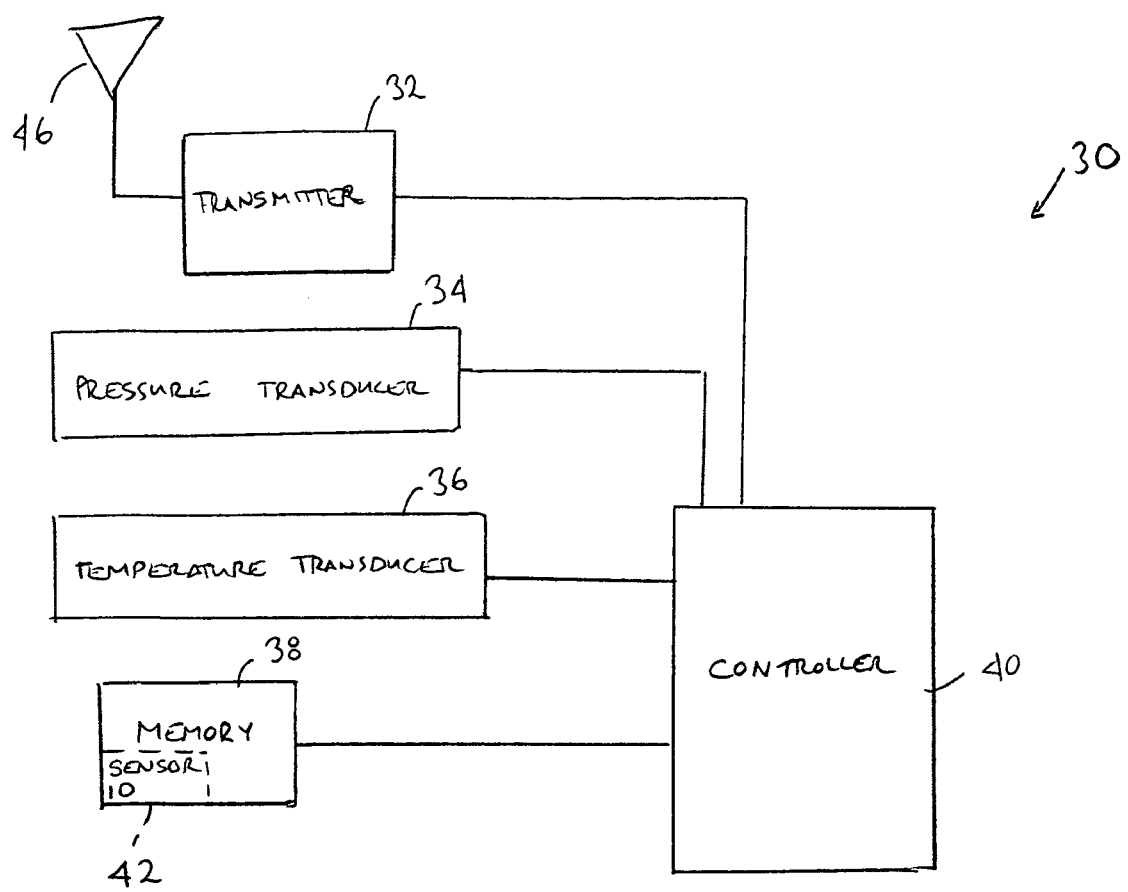
FIG. 2 is a schematic view of the sensor of FIG. 1.

Turning to FIG. 2, sensor 30 may comprise a transmitter 32, pressure transducer 34, temperature transducer 36 and memory 38 in communication with a controller 40. The pressure transducer 34 may be any conventional pressure transducer, such as a piezoresistive pressure sensor. For example, pressure transducer 36 may be the model 1451 sensor made by KS Sensors. The temperature transducer may also be any conventional temperature transducer. For example the temperature transducer may be a thermistor. The controller 40 may be, for example, a programmed processor or a field programmable field array. Memory 38 may be a persistent memory, such as a flash memory. Memory 38 stores an identifier 42 of sensor 30, such as a unique sensor serial number. The sensor may be battery powered. For example, the sensor may be adapted to be powered by two "AA" batteries.

Controller 40 may be configured to periodically read a pressure reading from pressure transducer 34 and a temperature reading from temperature sensor 36 and compensate the pressure reading based on the temperature reading. The sensor may then retrieve the sensor identifier 42 and construct a message with the sensor identifier and compensated pressure reading. The message may then be sent by the controller to transmitter 32 which wirelessly broadcasts the message over antenna 46. The transmitter may be configured to employ any suitable encoding and modulation scheme in transmitting the message.

While temperature compensation may be effected in any known manner, one suitable approach is to amplify the output from pressure transducer 34 by an amplifier (not shown) whose gain and voltage offset values have been appropriately selected. More specifically, at the factory, the output voltage from the pressure transducer may be measured at three temperatures: say −20° C., 20° C. and 60° C. Suitable offset voltage and gain correction values at these temperatures for the amplifier may then be determined and stored in the memory 38 of sensor 30. On the other hand, if a temperature reading from temperature transducer 36 of sensor 30 is higher than the middle one of the three stored temperatures, the stored gain and offset values at the higher two temperatures are used to linearly interpolate a gain and offset for the temperature read. The linearly interpolated gain and offset values are then applied to the amplifier so that the output of the amplifier is a temperature compensated pressure indication. Thereafter, if a temperature reading from temperature transducer 36 of sensor 30 is lower than the middle one of the three stored temperatures, the stored gain and offset values at the lower two temperatures are used to linearly interpolate a gain and offset for the temperature read. The linearly interpolated gain and offset values are then applied to the amplifier so that the output of the amplifier is a temperature compensated pressure indication.

A sensor 30 may be associated with each of the other axles of the trailer 13 and with each of the axles of the truck 11.

Figure 2A:
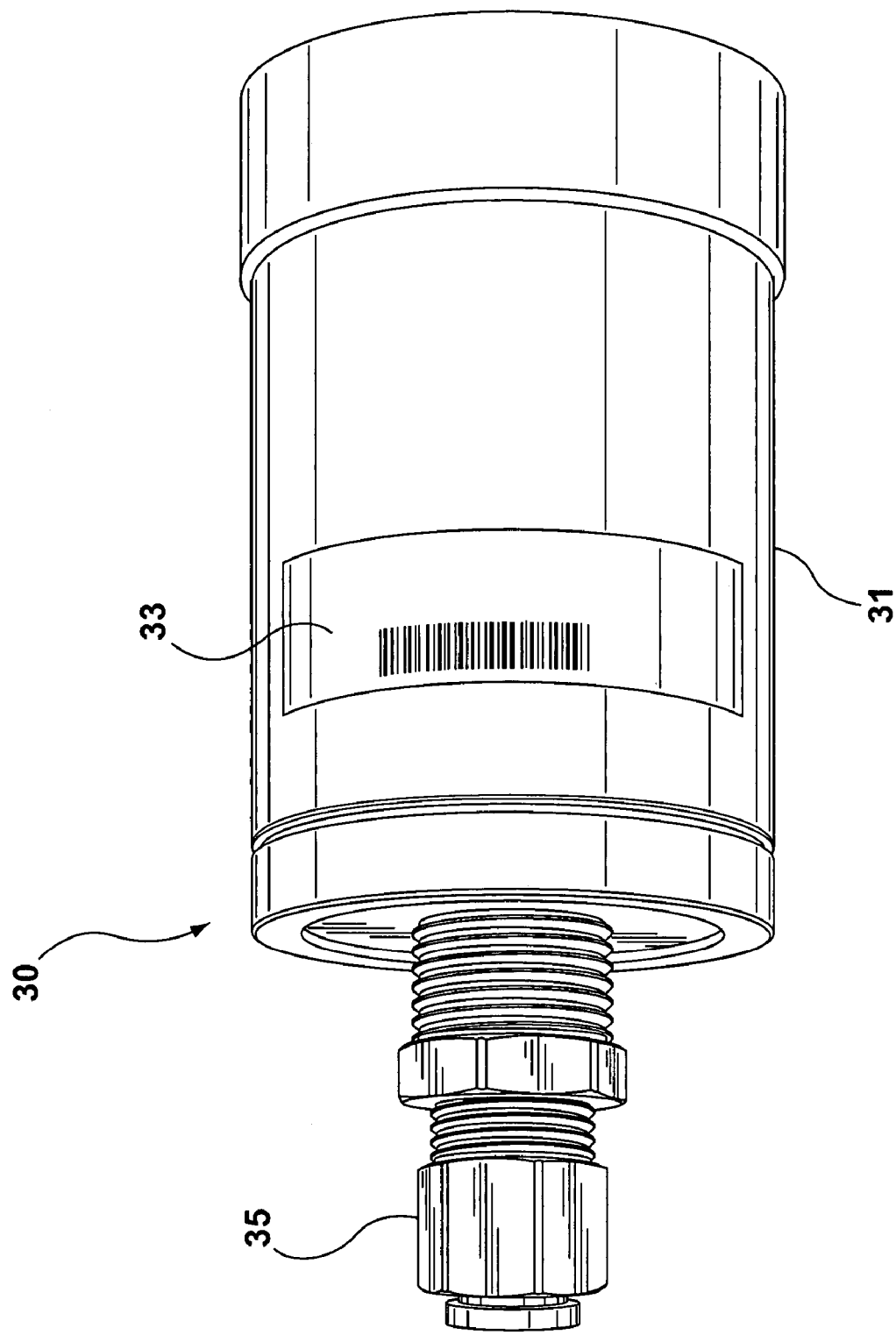
FIG. 2A is a perspective view of the sensor unit.

As shown in FIG. 2A, sensor 30 may have a housing 31 which houses the aforementioned components of the sensor, that is, transmitter 32, pressure transducer 34, temperature transducer 36, memory 38, controller 40 and the batteries which power the active components. Housing 31 may be a waterproof and weatherproof sealed housing 31 made from any suitable material, such as ABS plastic material or anodized aluminum.

Housing 31 may assist in resisting the effects of shocks that might result from impacts such as from rocks and the like when the vehicle is moving on a roadway.

Housing 31 may have a label 33, such as a bar code label or an RFID label, which incorporates the sensor identifier (which, as noted, may be a unique serial number associated with the sensor).

Housing 31 may have a fitting 35 which may be connected to tubing 25 (FIG. 1B) to interconnect the sensor 30 to the vehicle air suspension system through T-connector 32 (FIG. 1B), as is further described hereinafter. Fitting 35 provides the inlet to the sensor 30 to put pressure transducer 34 in communication with the air springs so the air pressure in air springs can be measured.

Figure 3:
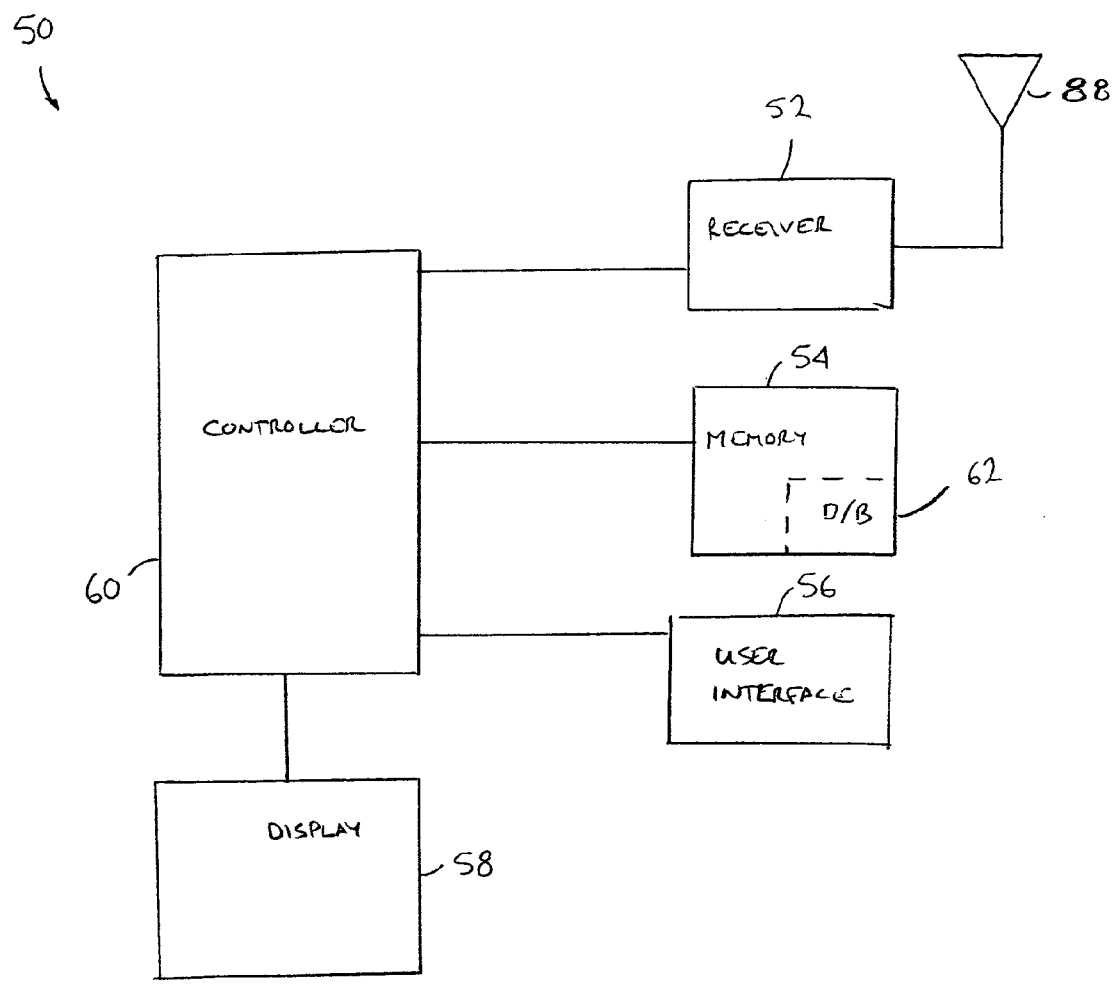
FIG. 3 is a schematic view of a central unit.
Figure 3A:
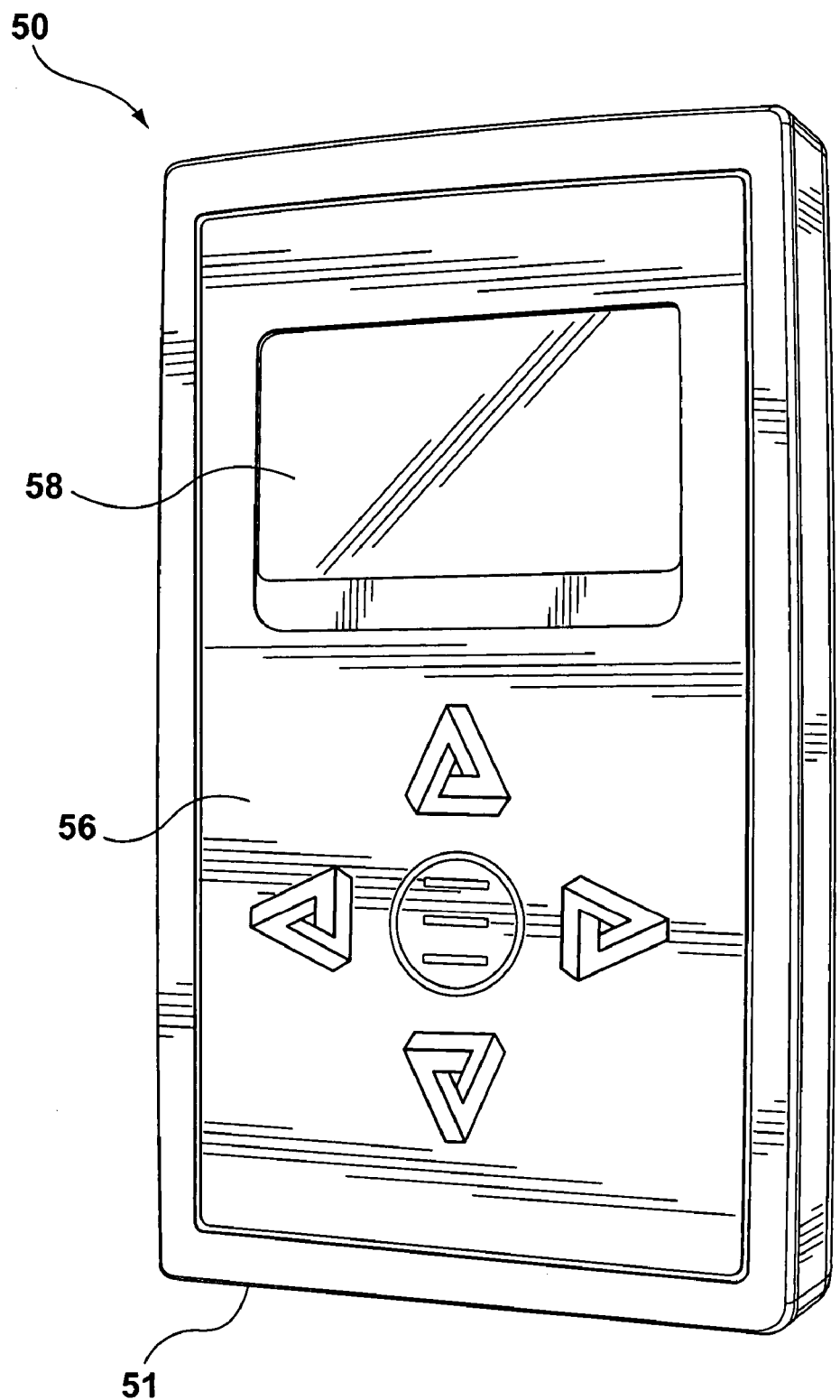
FIG. 3A is a perspective view of the central unit.

With reference to FIG. 3, a central unit 50 comprises a receiver 52, memory 54, user interface 56, and display 58 all of which are communicatively coupled to a controller 60. The controller may be, for example, a programmed processor. Memory 54 may be a persistent memory, such as a flash memory. The memory may store a database 62. The unit may be battery powered. As shown in FIG. 3A, the various components of central unit 50 may be housed in a case 51 that may be made from a suitable material, such as plastic. The central unit 50 may be sized as, and used as, a handheld device. Alternatively, the unit 50 may be attached within the cab of truck 11 (FIG. 1A).

Figure 4:
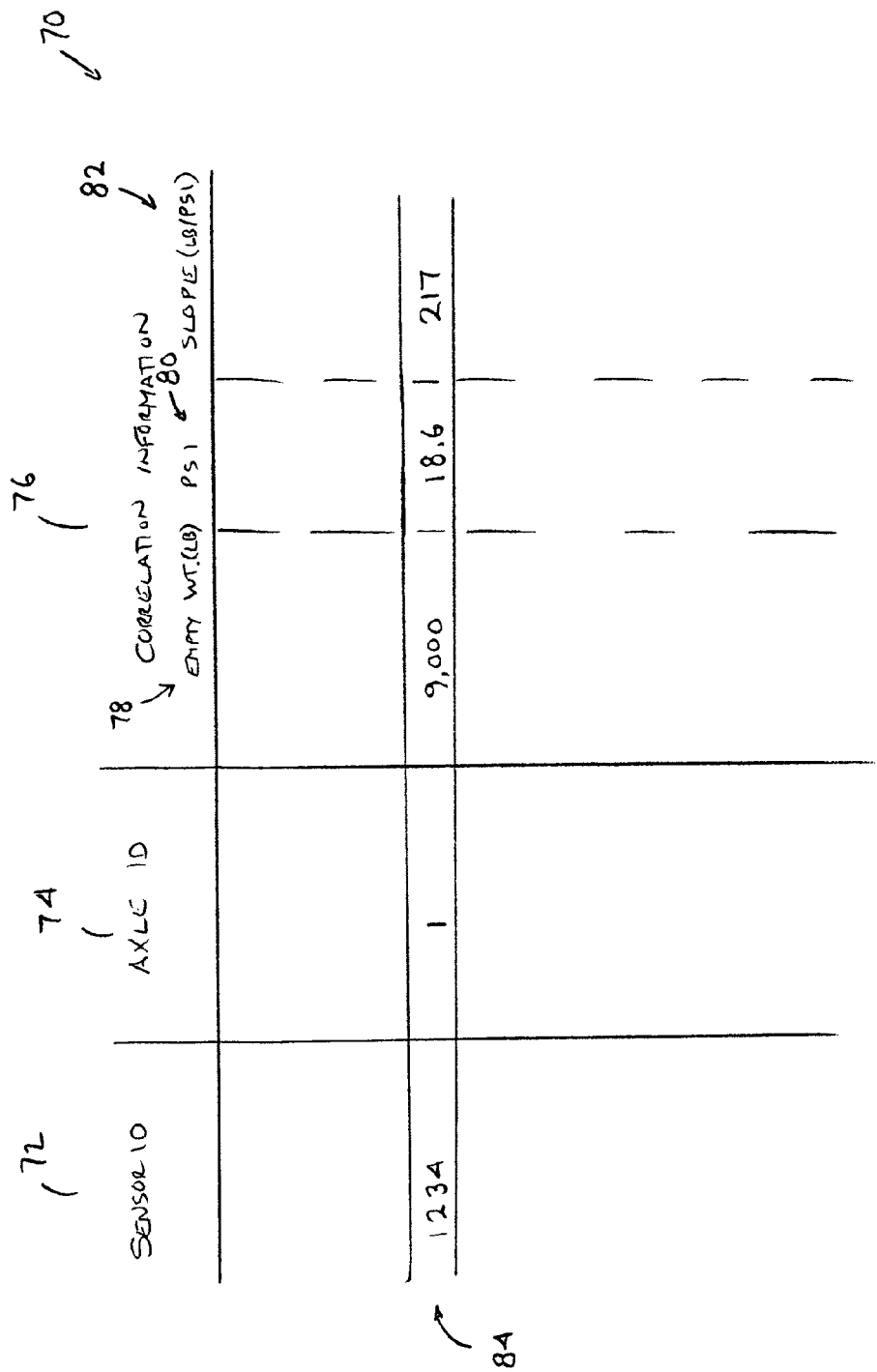
FIG. 4 is a view of a table stored in memory of the unit of FIG. 3.

Turning to FIG. 4, database 62 may store information which represents a table 70 with a column 72 for sensor identifiers, a column 74 for axle identifiers, and a column 76 for correlation information. The correlation information column may be divided into a sub-column 78 for empty weight in pounds, a sub-column 80 for pressure in pounds per square inch (PSI) and a sub-column 82 for slope in pounds per PSI. Thus, any row of table 70, such as row 84, will represent a sensor identifier and an associated axle identifier and correlation information.

Returning to FIG. 3, when receiver 52 receives a wireless message over its antenna 88, it may demodulate and decode the message as necessary and pass it to controller 60. The transmitter 32 may have a range of in the order of up to 500 to 1,000 feet. The controller 60 may parse the message for a sensor identifier, a pressure indication, which may be in PSI, and a temperature indication. The controller may utilise the sensor identifier as a key into table 70. Thus, the controller may retrieve the row of information associated with the sensor identifier in the incoming message and thereby obtain an axle identifier and correlation information associated with the sensor identifier. The controller 60 may be configured to utilise the correlation information to convert the pressure indication to a weight measure associated with the axle identifier. The controller 60 may then display this information, along with the pressure indication, on its display 58.

Figure 5:
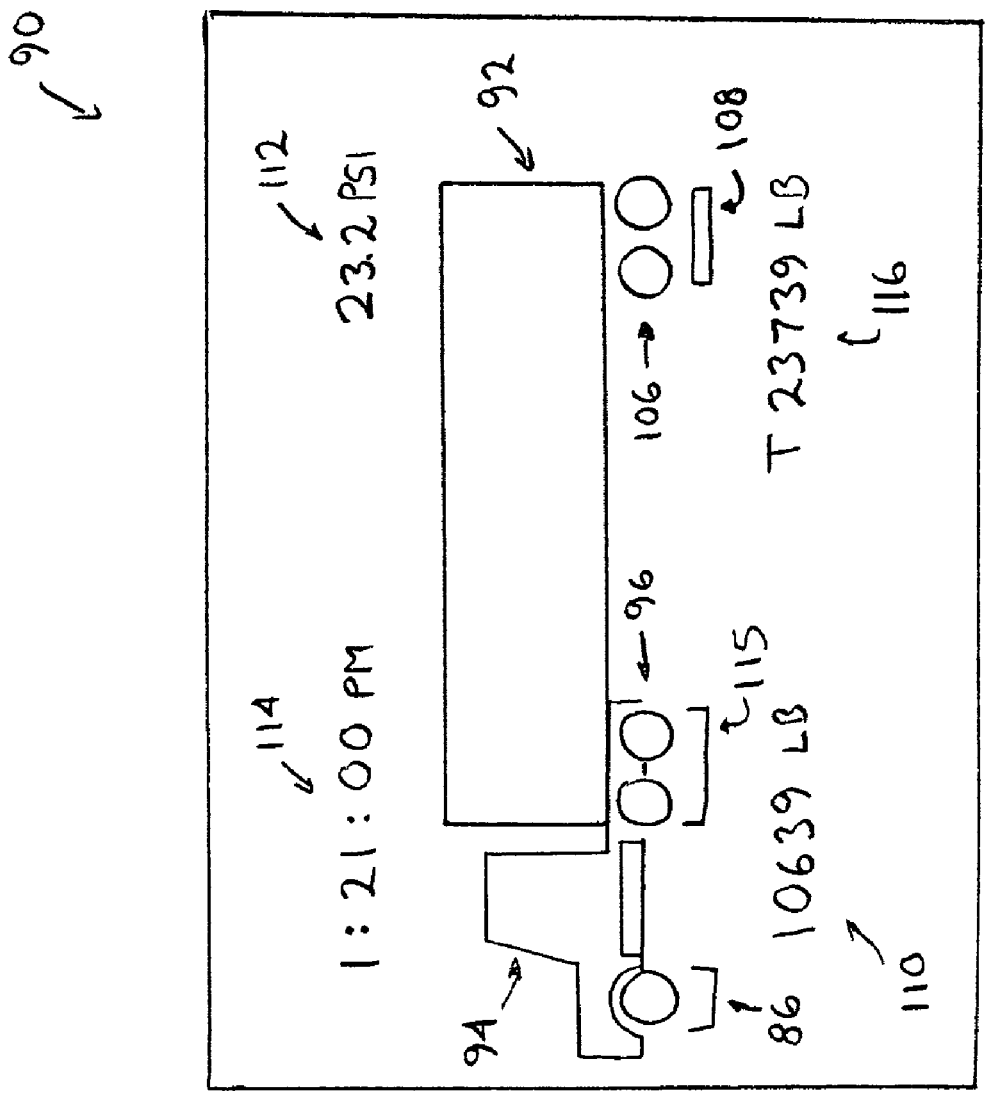
FIG. 5 is a screen shot from the display of the unit of FIG. 3.

An exemplary screen shot on display 58 is illustrated in FIG. 5. Turning to FIG. 5, screen shot 90 may have a trailer depiction 92 depicting trailer 13 (FIG. 1A) and a truck depiction 94 depicting the truck 11 (FIG. 1A) pulling the trailer. Each axle or axle group of the vehicle may also be depicted, here axle depiction 86 and axle group depictions 96 and 106. The screen shot may display a bar 108 to indicate a particular axle group and a weight indication 110 of the weight associated with the axle group indicated by bar 108. The weight displayed may be that determined by controller 60 (FIG. 3) as aforedescribed. The screen shot may also show a pressure indication at 112 and a brace 115 for each other axle or axle group for which an associated pressure and weight may be displayed. The screen shot may also have a time and/or date indication 114 if a time clock is associated with unit 50 and outputs to controller 60.

Each sensor 30 may broadcast an updated message once per minute and the controller 60 of unit 50 may display the received pressure indication and the determined axle group weight based on messages received from sensors in serial fashion. Alternatively, unit 50 may display an axle group weight based on a selection made via user interface 56.

Once the controller 60 has received an axle (or axle group) weight from the sensor for each axle (or axle group) of vehicle 10, it may determine a total vehicle weight and also display this. Screen shot 90 shows this at total weight depiction 116.

Figure 6:
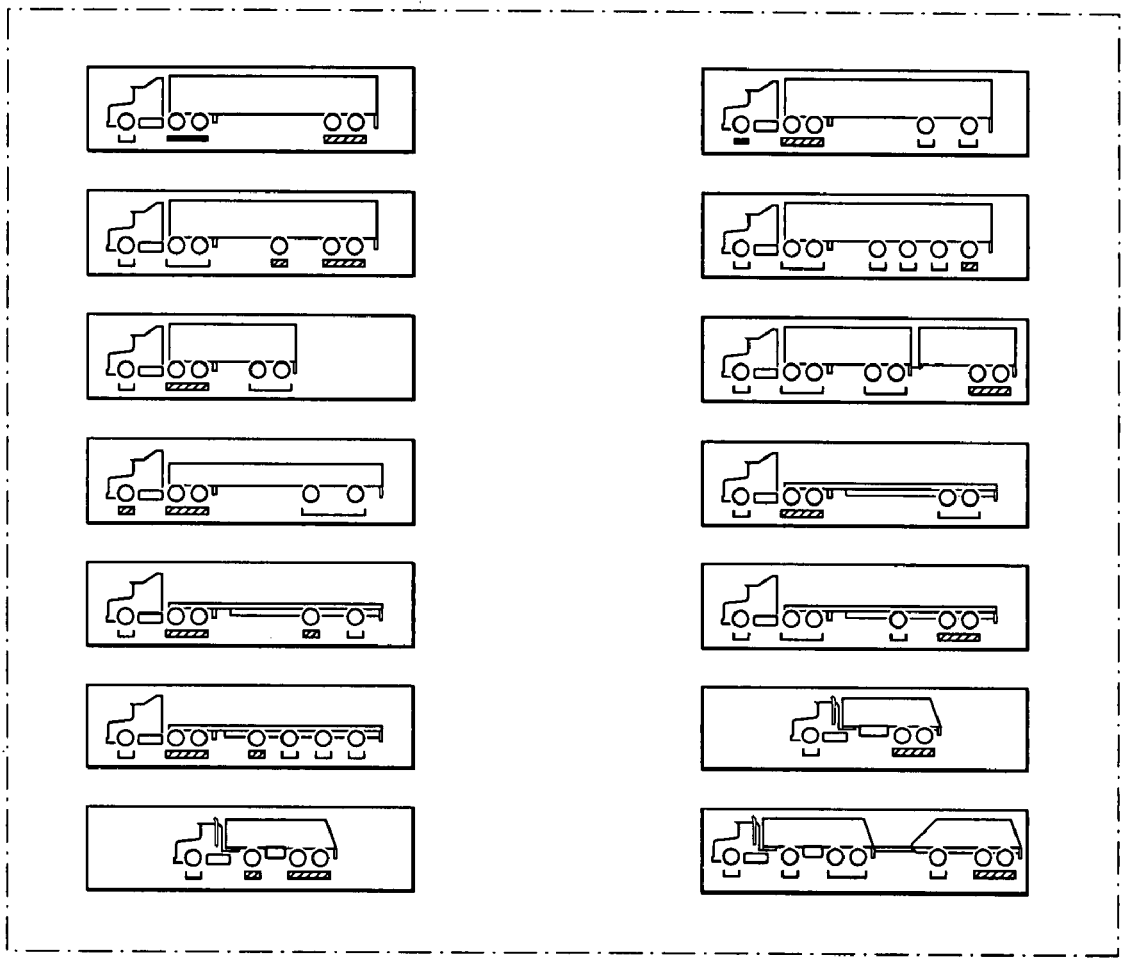
FIG. 6 is another screen shot from a display of the unit of FIG. 3.

Unit 50 may have two modes: a locked mode wherein the unit operates as described hereinabove, and a configuration mode. In the configuration mode, through user interface 56, a user may select a vehicle type and associate a sensor identifier with each axle and axle group of the selected vehicle type. For example, unit 50 may store the vehicle depictions illustrated in FIG. 6 for display on display 58, each of which depictions shows a different vehicle type. Each vehicle depiction shows a specified number of sensor locations, with each sensor associated with a particular wheel axle or wheel axle group. Once the user has selected a vehicle type and entered a sensor identifier (obtained from label 33 of the sensor) associated with each axle or axle group of the selected vehicle type, the user may also associate (i) an empty weight and an empty pressure and (ii) a full weight and a full pressure with each sensor. This can be done by using a conventional weight scale to calibrate each sensor. More specifically, the vehicle can be driven to a conventional weight scale with no load in the trailer. The empty weight may then be recorded for each axle or axle group of the vehicle and this information entered into unit 50. The process may be repeated at the weight scale when the vehicle is fully loaded, and the loaded weight recorded for each axle or axle group and then entered into unit 50. With this information, the controller 60 of unit 50 may determine the correlation information to associate with each sensor 30 and store into table 70, thereby calibrating each sensor.

More specifically, with the axle/axle group empty weight and pressure, and full weight and pressure, assuming a linear relationship between weight and pressure, the controller 60 can calculate a slope of the line relating pressure to weight and store this slope as part of the correlation information. With the empty weight and associated pressure, and the slope, the controller 60 can thereafter calculate the weight at any pressure. Greater accuracy would be possible if the effort were expended to determine additional pressure weight correlations for different partial loadings of the vehicle. With these additional correlations, the controller could model a non-linear relationship between pressure and weight as part of the correlation information. However, in many instances the increased accuracy is not sufficient to warrant the effort.

Each sensor 30 only needs to be calibrated once with unit 50 as the correlation information may be persistently stored for repeated use in measuring loads.

With a sufficiently large memory 54 in unit 50, database table 70 could hold data for sensors from a plurality of trailers. Thus, if a truck 11 were used with two or more different trailers, a unit 50 could be used with the truck when pulling any of these trailers after sensor data for each of the sensors of the various trailers had been stored to table 70.

The described system may be supplied as a kit and retrofit to a vehicle. The kit may include a central unit 50 and a set of sensors, each supplied with a T-connector and a length of tubing. The retrofit may proceed as follows. Firstly, a sensor 30 may be attached to the vehicle at each axle and axle group. The air line may be cut to introduce a T-connector 32 between the valve 26 and the air springs 20 of the axle/axle group and an air line 25 may be run from the free fitting of the T-connector to the sensor. The sensor identifier and associated axle/axle group for each sensor may be noted and input to unit 50 as aforedescribed. The vehicle may then be weighed empty and full so that axle group weight and associated pressure parameters may be input to unit 50 as aforedescribed.

The sensor can readily be operationally installed on the vehicle in a relatively short period of time, such as for example about 10-30 minutes. As it is not necessary to splice or connect to the vehicle's electrical system, only the air suspension system, many drivers/driver-operators are qualified to perform the installation themselves. Therefore, in many situations a visit to a fully qualified vehicle maintenance technician is not required.

In normal operation, the sensors may send the messages at a fixed periodic interval of time. Optionally, if each sensor 30 and unit 50 are provided with transceivers (rather than a transmitter and receiver, respectively) through user interface 56, unit 50 may be set to prompt sensors 30 to alter the value of the periodic interval and may send pressure indication messages more frequently, say once every three seconds. This alteration in the periodic interval for sending messages may continue either for a predetermined period of time (such as for example about 15 minutes), or until it is again altered through the user interface. This allows near real time monitoring of the weight of the trailer during loading so as to guard against overloading. Alternatively, each sensor 30 may be configured such that if the rate of pressure change exceeds a threshold rate, the sensor automatically adjusts the periodic interval and may then send pressure indication messages more frequently. This avoids the need to configure unit 50 with a transceiver. Further, this feature may alert a user to a situation wherein a load is being lost. The altering of the periodic interval can then continue for a predetermined period of time (such as for example again about 15 minutes) or until it is again altered through the user interface. The alerting function is enhanced if unit 50 responds to receiving messages from a sensor at the higher rate by generating an alarm signal.

If unit 50 is provided with a transceiver, unit 50 could also be used to otherwise configure the sensors (e.g., poke new temperature compensation values into sensor memory).

While the vehicle to which the weight sensing system has been applied has been described as a truck pulling a trailer, obviously the system may be applied to other vehicle types, such as a tractor pulling a trailer, or a one-piece vehicle, such as a dumpster or van.

Optionally, a sensor 30 may be configured to generate a message which is related to another weight related parameter, rather than pressure in the air suspension system. For example, the displacement in a mechanical suspension, such as a leaf spring, coil spring or other mechanical suspension, can be measured and broadcast by sensor 30 to unit 50. In this instance, unit 50 will have a weight/displacement correlation database table constructed in a manner similar to the database table 70 described above.

While unit 50 has been described as associated with a truck 11, it would be possible to associate unit 50 with a central station, such as a central station for a vehicle fleet. In this instance, unit 50 may be provided with an extended memory. The memory of unit 50 could then store a row in its database table 70 for each sensor of each truck and trailer in the fleet. The unit 50 could then be used centrally to monitor vehicle weights. Indeed, if database 70 stored information for each sensor of each vehicle which was expected at a weigh station, unit 50 could be used to replace or supplement a conventional weigh station. Indeed, vehicles fitted with sensors 30 might avoid having to go through a conventional weigh scale facility instead passing through an area where a unit 50 can quickly retrieve the information broadcast from sensors 30 on vehicles so equipped.

Where it is expected that a unit 50 will store data from sensors on more than one trailer, it may be necessary for the unit 50 to also store a trailer identifier in association with each sensor in database table 70. This trailer identifier may be entered by a user when the unit 50 is in its configuration mode. The user may then use the user interface 54 to select the identifier of the trailer currently part of the vehicle. If this is done, then unit 50 will ignore wireless signals that may be received from any sensors not associated with the selected trailer, even if data for those sensors is stored in database table 70.

Optionally, the sensors could also store an axle group type description and ride height setting. This would be advantageous for a fleet of similar trailers which differ only in these parameters. In this situation, an empty and full weight calibration would only need to be performed for the sensors of one of the set of similar trailers and the calibration data then loaded to each unit 50 used with any of these trailers. A unit 50 could then correlate pressure from a sensor with a weight based on the common calibration data and the sensor specific axle group type description and ride height setting information.

Optionally, rather than table 70 storing an empty weight and associated pressure along with a slope, table 70 could store an empty weight and associated pressure, and a full weight and associated pressure. In each instance, controller 60 may calculate a correlation factor on-the-fly from this correlation information and a received pressure indication.

Optionally, messages from the sensors can be encrypted.

Other modifications will be apparent to those skilled in the art and, therefore, the invention is defined in the claims.

What is claimed is:

1. A method for determining a vehicle weight comprising:
receiving a message comprising a sensor identifier and a weight related parameter indication;
utilising said sensor identifier to obtain correlation information;
obtaining a weight measure based on said weight related parameter indication and said correlation information.

2. The method of claim 1 wherein said weight related parameter indication is an air pressure indication.

3. The method of claim 2 wherein said message further comprises a temperature indication and further comprising modifying said pressure indication based on said temperature indication prior to said obtaining.

4. The method of claim 2 further comprising storing an axle identifier identifying any axle or axle group in association with said sensor identifier and, after said obtaining, associating said weight measure with said axle identifier.

5. The method of claim 4 further comprising:
receiving a first said message comprising a first air pressure indication;
receiving a first weight measure;
receiving a second said message comprising a second air pressure indication;
receiving a second weight measure;
correlating said first air pressure indication to said first weight measure and said second air pressure indication to said second weight measure to obtain said correlation information; and
storing said correlation information.

6. A vehicle weight determination apparatus, comprising:
a receiver;
a persistent memory storing a plurality of sensor identifiers,
a like plurality of axle identifiers and a like plurality of correlation information, such that a given sensor identifier is associated with a given axle identifier and given correlation information;
a controller for:
receiving from said receiver a message comprising a sensor identifier and an air pressure indication,
utilising said sensor identifier to obtain an axle identifier and correlation information,
utilising said correlation information and said pressure indicator to obtain a weight measure associated with said axle identifier.

7. The apparatus of claim 6 further comprising a display for displaying said weight measure and said axle identifier.

8. A vehicle weight determination apparatus, comprising:
a pressure transducer;
a transmitter;
a persistent memory for storing a sensor identifier;
a controller for:
receiving a pressure indication from said pressure transducer;
retrieving said sensor identifier;
constructing a message comprising said sensor identifier, said pressure indication;
controlling said transmitter to send said message.

9. An apparatus as claimed in claim 8 further comprising a temperature transducer wherein said controller further receives a temperature indication from said temperature transducer and said message is constructed with said temperature indication.

10. A method for determining a vehicle weight comprising:
generating a message comprising a sensor identifier and a weight related parameter indication;
broadcasting said message to a unit comprising a receiver;
said receiver receiving said message;
said unit utilising said sensor identifier to obtain correlation information;
said unit obtaining a weight measure based on said weight related parameter indication and said correlation information;
displaying said weight measure on a display associated with said unit.

11. A method as claimed in claim 10 wherein said unit is a hand-held device.

12. A system for determining a vehicle weight comprising a sensor and a unit:
said sensor operable to generate a message comprising a sensor identifier and a weight related parameter indication and broadcast said message to said unit;
said unit comprising a receiver for receiving said message broadcast from said sensor and said unit operable to utilise said sensor identifier to obtain correlation information stored in a database;
said unit operable to generate a weight measure based on said weight related parameter indication and said correlation information and operable to display said weight measure on a display associated with said unit.

13. A system as claimed in claim 12 wherein said unit is a hand-held device.

14. A kit comprising:
a sensor and a unit;
said sensor comprising a housing and being operable to generate a message comprising a sensor identifier and an air pressure indication and broadcast said message to said unit;
said unit comprising a receiver for receiving said message broadcast from said sensor and said unit operable to utilise said sensor identifier to obtain correlation information stored in a database;
said unit operable to generate a weight measure based on said air pressure indication and said correlation information and operable to display said weight measure on a display in said unit;
said kit further comprising a length of tubing and a connector, said connector adapted for being inserted into an air vehicle suspension line of a vehicle air suspension system, and said length of tubing adapted to connect an outlet of said connector to an inlet to said housing of said sensor.

15. A kit as claimed in claim 14 wherein said unit is a hand-held device.

16. A method of retrofitting a vehicle comprising an air suspension system, said air suspension system comprising at least one air spring associated with an axle or axle group, said air spring comprising an air line for supplying pressurized air to said air spring, said method comprising:
attaching a sensor to the vehicle, said sensor comprising an inlet for receiving communication of pressurized air, said sensor operable to generate a message comprising a sensor identifier and an air pressure indication related to pressure of said pressurized air and broadcast said message to a unit;
introducing a connector into said air line in said air suspension system to provide an outlet;
connecting said outlet of said connector to said inlet of said sensor, so as to communicate pressurized air from said air line to said inlet of said sensor.

17. A method for determining a weight of a vehicle comprising:
providing a plurality of sensors, each of said sensors associated with an axle or axle group of said vehicle;
each said sensor generating a message comprising a sensor identifier and a weight related parameter indication;
broadcasting each said message from each said sensor to a unit.

18. A method as claimed in claim 17 wherein said unit is a hand-held device.

19. A method as claimed in claim 17 further comprising:
said unit receiving each said message and utilising said sensor identifier to obtain correlation information for each said message from each said sensor, said unit further obtaining a weight measure based on said weight related parameter indication and said correlation information;
displaying each said weight measure from each said sensor on a display associated with said unit.

20. A method as claimed in claim 19 further comprising:
adding each said weight measure to produce a total weight measure;
displaying said total weight measure.

21. A method for determining a weight of each of a plurality of vehicles comprising:
providing at least one sensor for each vehicle of a plurality of vehicles;
each said sensor generating a message comprising a sensor identifier and a weight related parameter indication;
broadcasting each said message from each said sensor to a unit.

22. A method as claimed in claim 21 further comprising:
said unit receiving each said message at said unit and utilising said sensor identifier to obtain correlation information for each said message from each said sensor, said unit further obtaining a weight measure based on said weight related parameter indication and said correlation information;
displaying said weight measure on a display associated with said unit.

23. A kit comprising:
a sensor comprising a housing and said sensor being operable to generate a message comprising a sensor identifier and an air pressure indication and broadcast said message to a unit;
a length of tubing;
a connector adapted for being inserted into an air vehicle suspension line of a vehicle air suspension system, and said length of tubing adapted to connect an outlet of said connector to an inlet to said housing of said sensor.

24. A kit as claimed in claim 23 wherein said connector is a T-connector.

25. A method for determining vehicle weight information comprising:
a) broadcasting a message comprising a sensor identifier and a weight related parameter indication;
b) utilising said sensor identifier to obtain correlation information;
c) obtaining a weight measure based on said weight related parameter indication and said correlation information.

26. A method as claimed in claim 25 wherein steps (a)-(c) are repeated at a periodic interval.

27. A method as claimed in claim 26 wherein said periodic interval is variable.

28. A method as claimed in claim 26 wherein said periodic interval is varied by an external input.

29. A method as claimed in claim 26 further comprising:
(d) measuring the change in the weight related parameter over an interval of time;
(e) monitoring said measured change to determine when said measured change exceeds a threshold level;
(f) when said measured change exceeds said threshold level, adjusting the value of said periodic interval.

30. A method as claimed in claim 29 wherein said value is adjusted to shorten the length of said periodic interval.

31. A method as claimed in claim 29 wherein said interval of time corresponds to said periodic interval.

32. A method as claimed in claim 25 wherein said weight related parameter is a pressure indication.

33. A method for determining a weight of a vehicle comprising:
(a) providing a sensor associated with an axle or axle group of said vehicle;
(b) said sensor generating a message comprising a sensor identifier and a weight related parameter indication;
(c) broadcasting each said message from each said sensor to a unit at a periodic interval.

34. A method as claimed in claim 33 wherein said periodic interval is variable.

35. A method as claimed in claim 33 wherein said periodic interval is varied by an external input.

36. A method as claimed in claim 33 further comprising:
(d) measuring the change in the weight related parameter over an interval of time;
(e) monitoring said measured change to determine when said measured change exceeds a threshold level;
(f) when said measured change exceeds said threshold level, adjusting the value of said periodic interval.

37. A method as claimed in claim 36 wherein said value is adjusted to reduce the value of said periodic interval.

38. A method as claimed in claim 36 wherein said interval of time corresponds to said periodic interval.

39. A method as claimed in claim 33 wherein said weight related parameter is a pressure indication.

* * * * *